United States Patent [19]

Kamerman

[11] Patent Number: 4,849,989
[45] Date of Patent: Jul. 18, 1989

[54] DATA MODEM RECEIVER

[75] Inventor: Adriaan Kamerman, Nieuwegein, Netherlands

[73] Assignee: NCR Corporation, Dayton, Ohio

[21] Appl. No.: 237,932

[22] Filed: Aug. 29, 1988

[30] Foreign Application Priority Data

Jan. 13, 1988 [GB] United Kingdom ................. 8800740

[51] Int. Cl.$^4$ ............................................. H04B 3/10
[52] U.S. Cl. ................................. 375/13; 340/825.74; 364/724.09
[58] Field of Search ...................... 364/724.01, 724.08, 364/724.09; 370/110.3; 328/133; 340/825.48, 825.74; 375/11, 12, 13; 379/282, 283, 287

[56] References Cited

U.S. PATENT DOCUMENTS

| 4,273,955 | 6/1981 | Armstrong | 178/69 G |
|---|---|---|---|
| 4,301,417 | 11/1981 | Jansen et al. | 329/50 |
| 4,362,997 | 12/1982 | van Driest | 329/50 |
| 4,528,519 | 7/1985 | van Driest | 330/279 |
| 4,530,104 | 7/1985 | Kamerman | 375/14 |
| 4,577,334 | 3/1986 | Boer et al. | 375/97 |
| 4,602,131 | 7/1986 | Soulliard et al. | 340/825.74 |
| 4,674,103 | 6/1987 | Chevillat et al. | 375/13 |
| 4,742,534 | 5/1988 | Verbeek et al. | 340/825.74 |

FOREIGN PATENT DOCUMENTS

| 0169548 | 7/1985 | European Pat. Off. |
|---|---|---|
| 0180066 | 7/1985 | European Pat. Off. |
| 0173569 | 8/1985 | European Pat. Off. |
| 0185332 | 12/1985 | European Pat. Off. |
| 0204308 | 6/1986 | European Pat. Off. |
| 0213224 | 3/1987 | European Pat. Off. |
| 2175480 | 5/1985 | United Kingdom |
| 2174274 | 10/1985 | United Kingdom |

OTHER PUBLICATIONS

Bennett, W. R. and Davey, J. R.; Data Transmission; McGraw-Hill, New York, 1965; pp. 182-190.

Lucky, R. W., Salz, Jr. and Weldon, E. J.; Principles of Data Communication; McGraw-Hill, New York 1968; pp. 226-232.

Biru, J. S.; Error Performace of Binary NCFSK in the Presence of Multiple Tone Interference and System Noise: IEEE Transaction on Communications, vol. COM-33, No. 3, Mar. 1985; pp. 203-209.

Sundberg, C. E.; Continuous Phase Modulation; IEEE Communications Magazine, vol. 24, No. 4, Apr. 1986; pp. 25-38.

Ansari, R. and Liu, B.; A Class of Low Noise Computationally Efficient Recursive Digital Filters; Proceedings IEEE International Symposium Circuits and Systems. Apr. 1981; pp. 550-553.

Ansari, R. and Liu, B.; A Class of Low Noise Computationally Efficient Recursive Digital Filters with Applications to Sampling Rate Alternations; IEEE Transactions on Acoustics, Speech & Signal Processing, vol. ASSP-33, No. 1, 2/85.

Jennings, F.; Practical Data Communications–Modems, Networks, Protocols; Blackwell Scientific Publications, Oxford 1986, p. 48.

(List continued on next page.)

Primary Examiner—Benedict V. Safourek
Attorney, Agent, or Firm—Wilbert Hawk, Jr.; Albert L. Sessler, Jr.; Richard W. Lavin

[57] ABSTRACT

In a data modem receiver (80) the received signal is digitized in an A/D-converter (84), the output of which is applied to notch filter means (88, 96) which eliminates secondary channel signals, and which applies an output signal to a pair of IIR filters (112, 116), responsive to the frequency components present in a training signal. The values of the IIR filter output sigals are determined and compared with a pair of threshold levels provided by a threshold setter circuit (152) responsive to the peak received signal level to detect the receipt of a training signal. In response to the detection of a training signal, DFT calculations are initiated for timing recovery and modem address identification, using samples stored in a buffer shift register (206). A gain control circuit (220) is located subsequent to a band-pass filter (212) coupled to the buffer shift register (206).

12 Claims, 10 Drawing Sheets

OTHER PUBLICATIONS

Godard, D. N.; Pass-Band Timng Recovery in an All-Digital Modem Receiver; IEEE Transactions on Communications, vol. COM-26, No. 5; May 1978.

Abramowitz, M., Stegun, J. A.; Handbook of Mathematical Functions; Dover Publications Inc., New York, 1972; Formula 4.3.100, p. 76.

Idem Reference Abramowitz, M., Stegun, J. A.; Formula 25.2.6, 25.2.7, p. 878.

CCITT-Data Communication over the Telephone Network-Vol. VIII-Fascicle VIII.1-Recommendations of the V-Series; Geneva 1985, Recommendation V29; pp. 203-215.

Carey, M. B., Chen, H. T.; Descloux, A., Ingle, J. F. and Clark K. I.; 1982/83 End office connection study-AT&T Bell Laboratories Technical Journal, vol. 63, No. 9, Nov. 1984; pp.2059-2119.

Motorola Inc. 2605 Series Data User Manual, Aug. 1984, Motorola Inc., Mansfield, Mass.

Racal Milgo's 14400 bit/s System Modem Omnimode 14.4 Manual.

DATA MODEM RECEIVER

BACKGROUND OF THE INVENTION

1. Field of the Invention.

This invention relates to data modem receivers of the kind for receiving analog signals transmitted on a transmission line from a remote location, said analog signals including a training signal having a spectrum with strong components at first and second predetermined frequencies, and analog-to-digital conversion means adapted to convert said analog signals to corresponding digital signals.

2. Description of the Prior Art.

In a multipoint data modem network, a master station polls several remote stations. A multipoint data modem communication system is known from European patent application No. 0,169,548. In this known system, the modem of the master station gives a continuous carrier signal which is received by each remote modem. If the terminal identity contained in the poll does not match the identity of the remote station then the poll is ignored. A remote station that recognizes the poll responds by sending one of two types of "messages"; either the first block of its data or a character sequence indicating no data to send. A remote station must use switched carrier signals when sending its "message" by turning on "request to send" to its modem before transmission and turning it off after transmission. Once a particular remote station becomes active, the master station modem must detect the carrier of the remote modem, extract the receiver timing signal, set internal gain parameters and acquire equalizer values to compensate for the transmission path to the active modem. Each modem communication channel has a separate and distinct path resulting in a different set of characteristics corresponding to attenuation, amplitude and delay distortion and phase impairments. Therefore, the master station modem must compensate for each communication channel individually. Each remotemaster communication channel requires the connected modem to send a training sequence to allow the master modem receiver to acquire the parameter required for reliable data transfer. For that purpose the master modem acquires receiver operating parameters and coefficients in a memory location allocated for the particular remote modem. The stored parameters include parameters for compensation of data timing clock offset and equalizer coefficients. At the beginning of a subsequent transmission the master modem receiver parameters and coefficients are loaded from values previously stored in the corresponding memory location. During subsequent transmissions from a remote modem, the modem is identified at the master modem by a time interval or by a set of frequencies. During short remote-master transmissions each training sequence occupies a significant part of the transmission time. It is therefore desirable to minimize the duration of the training sequence.

In a known data modem receiver of the kind specified, disclosed in U.S. Pat. No. 4,577,334, the start of an incoming line signal is detected by an energy detection circuit which operates when the received signal energy level exceeds a predetermined threshold. This has the disadvantage that the start of an incoming signal might be detected in response to noise or a secondary channel signal, rather than a valid training signal.

SUMMARY OF THE INVENTION

This invention relates to a data modem receiver of the kind specified, including first and second digital filters responsive respectively to first and second predetermined frequencies, first and second strength estimation means adapted to measure the respective strengths of the output signals of said first and second digital filters, threshold setting means adapted to provide first and second threshold level signals, and training signal detector means adapted to compare the outputs of said first and second strength estimation means with said first and second threshold level signals respectively and to provide a training indicator signal in response to both said first and second threshold level signals being exceeded.

It is thus an object of the present invention to provide a data modem receiver of the kind specified, which is capable of providing a robust and selective training signal detection, thereby enabling a very short training period.

BRIEF DESCRIPTION OF THE DRAWINGS

Additional advantages and meritorious features of the present invention will be apparent from the following detailed description and appended claims when read in conjunction with the drawings, wherein like numerals identify corresponding elements.

DESCRIPTION OF THE PREFERRED EMBODIMENT

Figure 1:
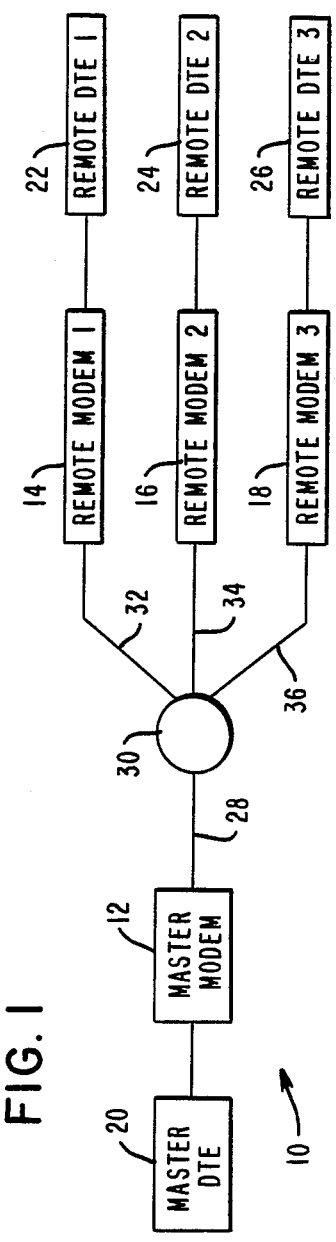
FIG. 1 is a block diagram of a data modem communication system, including a master modem and a plurality of remote modems.

Referring now to FIG. 1, there is shown a multipoint data modem communication system 10 including a master modem 12 and three remote modems 14, 16 and 18. In practice, a greater or lesser number of remote modems may be employed. The master modem 12 is connected to a master data terminal equipment (DTE)

unit 20 and the remote modems 14, 16 and 18 are connected to remote DTE units 22, 24 and 26. The master modem 12 is connected over a 4-wire telephone transmission line 28 to a branch point 30 which is connected over 4-wire telephone transmission lines 32, 34 and 36 to the respective modems 14, 16 and 18. Each of the 4-wire telephone transmission lines 28, 32, 34 and 36 includes a transmit pair of lines and a receive pair of lines.

Data is normally transmitted at a data bit rate of 14,400 bits per second, using a carrier frequency of 1800 Hz in accordance with CCITT Recommendation V.33, and using a modulation frequency of 2400 Hz (symbol rate of 2400 Baud). The modems operate with a sample clock frequency having nominal value of 9600 Hz, that is, four times the modulation frequency.

Figure 2:
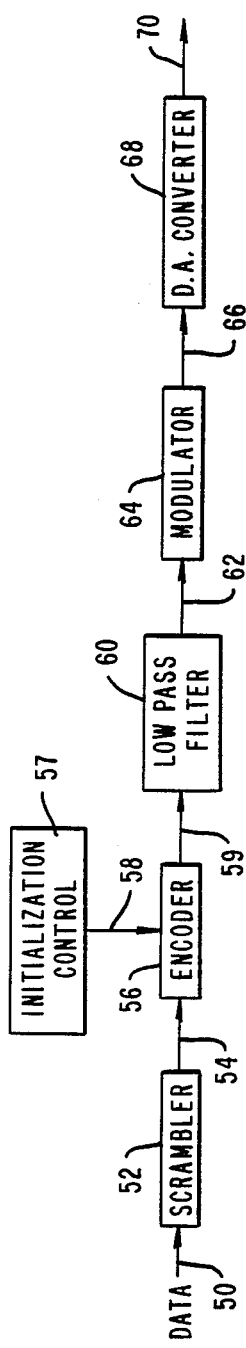
FIG. 2 is a block diagram of the remote modem transmitter.

Referring now to FIG. 2, there is shown a block diagram of the modem transmitter section of one of the modems 14, 16 and 18 shown in FIG. 1. Data signals from the associated data terminal equipment (DTE) are applied over an input line 50 to a scrambler 52. The output of the scrambler 52 is connected over a line 54 to an input of an encoder 56. An initialization control circuit 57 is connected over a line 58 to the encoder 56. The initialization control circuit 57 enables the encoder 56 to provide training signals as will be described hereinafter. The output of the encoder 56 is connected over a line 59 to a low-pass filter 60 the output of which is connected over a line 62 to a modulator 64. The output of the modulator 64 is connected over a line 66 to a digital-to-analog converter 68 which has an output line 70 connected to the associated telephone transmission line.

Figure 3A:
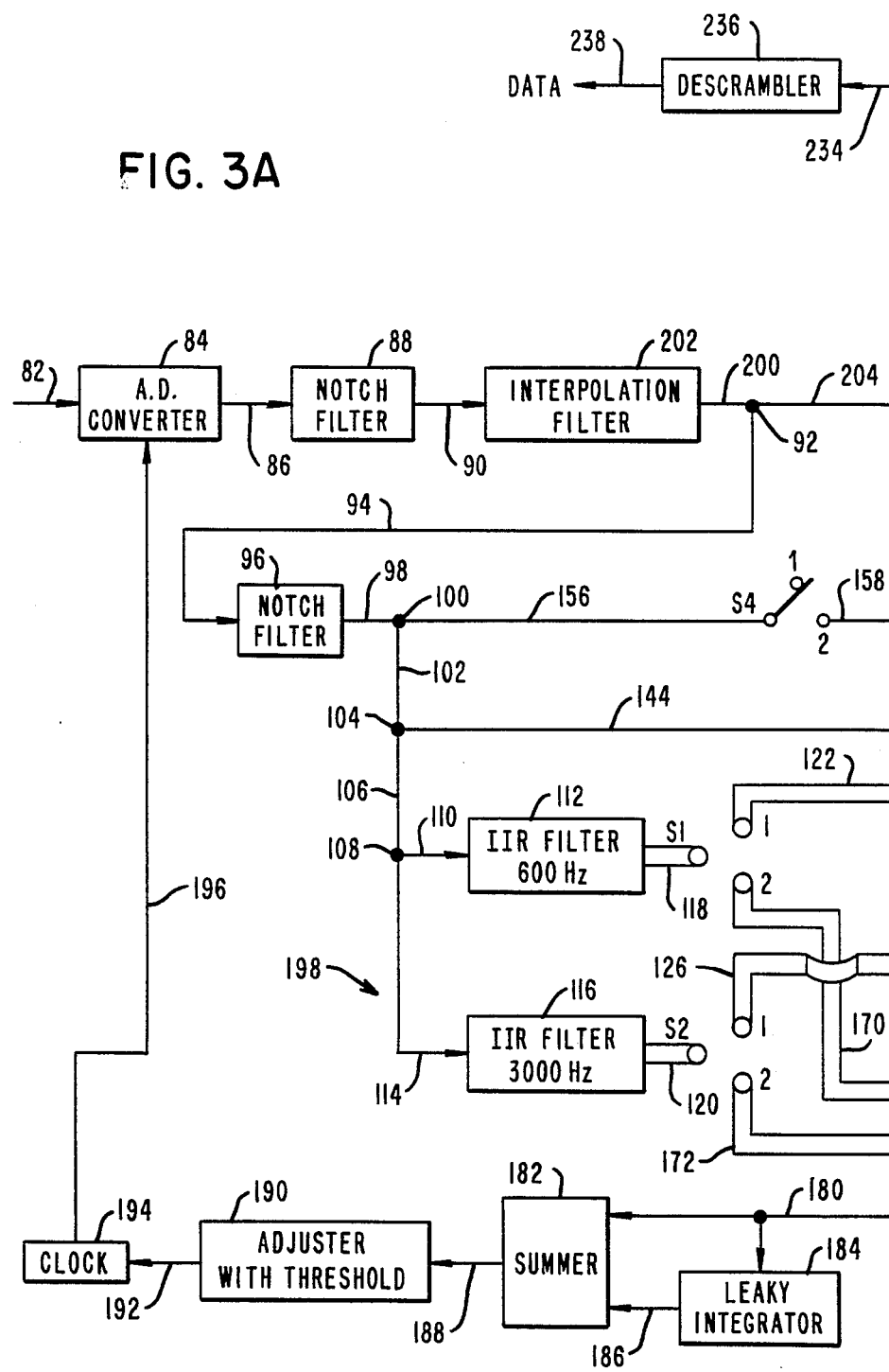
FIGS. 3A and 3B form a block diagram of the master modem receiver.
Figure 3B:
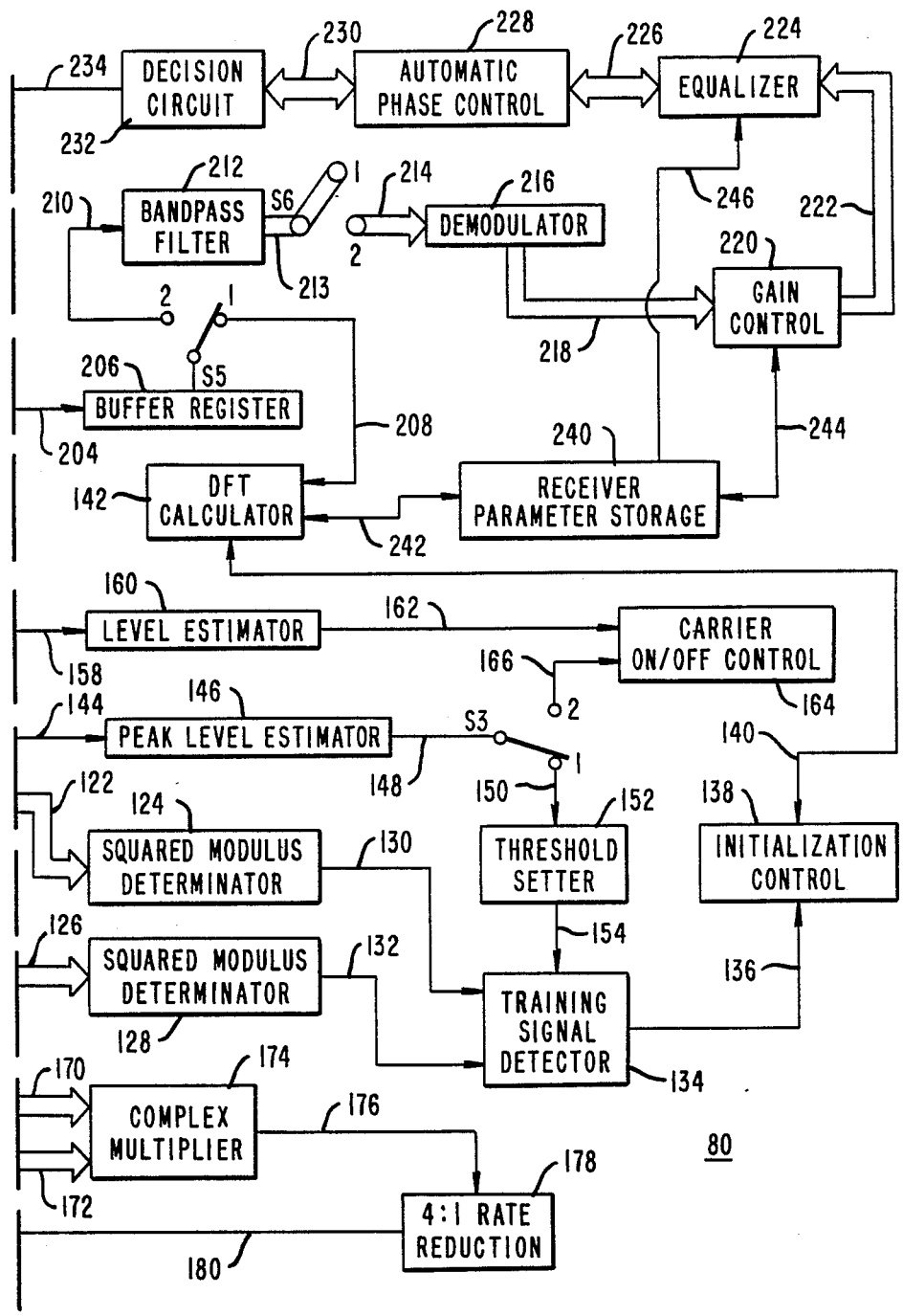

Referring to FIGS. 3A and 3B, there is shown a block diagram of the master modem receiver 80 included in the master modem 12 (FIG. 1). The signal received from the associated transmission line 28 is applied over an input line 82 to an analog-to-digital converter 84 forming digital sampling means. The analog-to-digital converter 84 has an output connected over a line 86 to a notch filter 88 which has an output connected over a line 90 to an interpolation filter 202. The interpolation filter 202, which improves the timing of the signal samples, has an output connected over a line 200 to a node 92. The interpolation filter 202 may be omitted, which results in a less accurate, but acceptable timing for signal samples. The node 92 is connected over a line 94 to a notch filter 96. The notch filter 96 has an output connected over a line 98 to a node 100. The node 100 is connected over a line 102 to a node 104 which is connected over a line 106 to a node 108. The node 108 is connected over a line 110 to an IIR (infinite impulse response) filter 112, tuned to 600 Hz, and over a line 114 to an IIR filter 116, tuned to 3000 Hz.

The output of the IIR filter 112, which is a complex value, is applied over pair of lines 118 to a switch S1 and the output of the IIR filter 116, which is also complex valued, is applied over a line 120 to a switch S2. The switches S1 and S2 have switching positions shown as terminals 1 and 2 in FIG. 3A. Terminal 1 of switch S1 is connected over a pair of lines 122 to a squared modulus determinator 124 (FIG. 3B) and terminal 1 of switch S2 is connected over a pair of lines 126 to a squared modulus determinator 128. The squared modulus determinator 124, 128 have outputs coupled over respective lines 130, 132 to a training signal detector circuit 134. The training signal detector 134 has an output connected over a line 136 to an initialization control circuit 138. The initialization control circuit 138 is coupled to a bidirectional bus 140 which is connected to a DFT calculator 142, which includes a plurality of individual DFT calculator circuits.

The node 104 (FIG. 3A) is further connected over a line 144 to a peak level estimator circuit 146 (FIG. 3B) which is connected over a line 148 to a two-position switch S3 having switch positions 1 and 2. Terminal 1 of the switch S3 is connected over a line 150 to a threshold setter circuit 152 which has an output connected over a line 154 to the training signal detector circuit 134. The node 100 (FIG. 3A) is connected over a line 156 to a two-position switch S4 having switch terminals 1 and 2, with terminal 2 being connected over a line 158 to a level estimator 160. The output of the level estimator 160 is connected over a line 162 to a carrier on/off control circuit 164, which also receives an input over a line 166 from position 2 of the switch S3. Position 2 of the switches S1 and S2 are connected over line pairs 170, 172 respectively, to a complex multiplier 174 which provides a real-valued output signal on a line 176 which is connected to a 4 to 1 rate reduction switch circuit 178. The out-put of the rate reduction switch 178 is connected over a line 180 to a summer 182 and to a leaky integrator 184 (FIG. 3A), which has an output connected over a line 186 to the summer 182. The output of the summer 182 is connected over a line 188 to an adjuster circuit 190, which operates when a threshold is crossed, and has an output connected over a line 192 to a modem clock generator circuit 194 which controls the sampling times of the analog-to-digital converter 84 over a line 196. It should be appreciated that when the switches S1 and S2 are in their position 2, the circuits 112, 116, 174, 178, 182, 184, 190 and 194 constitute a timing recovery circuit 198 in the form of a phase-locked loop (PLL).

The remaining portion of the modem receiver 80 (FIGS. 3A and 3B) will now be described. The node 92 (FIG. 3A) is connected over a line 204 to a buffer shift register 206. The buffer shift register 206 has thirty-two stages which are connected to thirty-two individual two-position switches, shown schematically in FIG. 3 as a single two-position switch S5. Switch terminal 1 of the switch S5 is connected over a line 208 to the DFT calculator 142, and switch terminal 2 of the switch S5 is connected over a line 210 to a band-pass filter 212. The output of the band-pass filter 212, which is a complex signal, is connected over a line 213 to a two-position switch S6 having terminals 1 and 2. Terminal 2 of the switch S6 is connected over a line 214 to a demodulator 216. The output of the demodulator 216 is connected over a line 218 to a gain control circuit 220, the output of which is connected over a line 222 to an equalizer 224. The output of the equalizer 224 is connected over a line 226 to an automatic phase control circuit 228 having an output connected over a line 230 to a decision circuit 232. The output of the decision circuit 232 is connected over a line 234 to a descrambler 236 which has an output line 238 on which DATA signals are provided representing data received by the modem receiver 80.

Also included in the modem receiver is a receiver parameter storage unit 240 (FIG. 3B) which is coupled to the DFT calculator 142, the gain control circuit 220 and the equalizer 224 over lines 242, 244 and 246 respectively, and is used to store equalizer coefficients and receiver parameters at locations associated with the respective transmitting modems during initial training sequences and to retrieve the stored coefficients and receiver parameters during subsequent training sequences.

At the commencement of the first transmission by each of the remote modems 14, 16 and 18 there is transmitted an initial training sequence consisting of six segments SG$_1$–SG$_6$, as shown in Table 1:

TABLE 1

| | \multicolumn{6}{c}{Initial Training Sequence} | | | | | |
|---|---|---|---|---|---|---|
| | SG$_1$ | SG$_2$ | SG$_3$ | SG$_4$ | SG$_5$ | SG$_6$ |
| (1) | 256 | 2976 | 128 | 78 | 48 | 48 |
| (2) | 107 | 1240 | 53 | 32 | 20 | 20 |

In Table 1 the first line (1) denotes the number of symbol intervals in the respective segments SG$_1$–SG$_6$ inclusive and the second line (2) denotes the corresponding approximate time in milliseconds. The segments are designated as follows:

SG$_1$: Segment 1: Alternations (180° phase alternations)
SG$_2$: Segment 2: Equalizer Conditioning Pattern
SG$_3$: Segment 3: Configuration Sequence
SG$_4$: Segment 4: Alternations (180° phase alternations)
SG$_5$: Segment 5: Equalizer Conditioning Pattern
SG$_6$: Segment 6: Scrambled All Binary 1's It will be appreciated that the total number of symbol intervals in the initial training sequence is 3534, corresponding to a total time of 1472 milliseconds approximately. Segments SG$_1$, SG$_2$ and SG$_6$ are conventional training signals segments, corresponding with CCITT Recommendation V.33. Segment SG$_3$ contains information relating to set-up conditions such as the data bit rate, the nature of the modulation, and other transmission-related parameters. The Segment SG$_4$ is utilized in calculations related to the timing adjustment. The Segment SG$_5$ provides a slight readjustment of the equalizer coefficients which is needed as a result of transmitting the Segment SG$_3$.

As mentioned above, during the initial training sequence the master modem receiver 80 acquires operating parameters and equalizer coefficients and stores these parameters and coefficients in the receiver parameter storage unit 240 (FIG. 3B) at a location associated with the transmitting remote modem. Each subsequent transmission by the remote modem commences with a short training signal, referred to as a subsequent training sequence consisting of only one segment, as shown in Table 2:

TABLE 2

| | Segment 1 Alternations | Total |
|---|---|---|
| No. of Symbol Intervals | 25 | 25 |
| Approximate time In Milliseconds | 10.4 | 10.4 |

The remote modem may be identified by transmitting a set of identifying frequencies in synchronism with the subsequent training sequence. Thus, the previously stored receiver parameters and coefficients can be retrieved from the identified location in the receiver parameter storage unit 240. The very brief training signal period (10.4 milliseconds in the preferred embodiment) is sufficient to set the receiver timing control by a shift introduced into the interpolation filter 202.

Figure 4A:
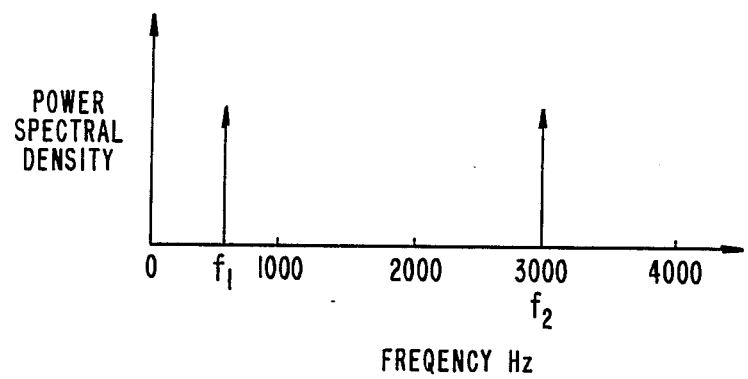
FIGS. 4A-4C inclusive are power spectral density plots illustrating training signal components and address frequencies.

Referring now to FIG. 4A, there is shown the power spectral density of the training signal alternations. The training signal contains strong spectral components at frequencies $f_1 = 600$ Hz and $f_2 = 3000$ Hz. These frequencies are derived from the equations:

$$f_1 = f_c - \tfrac{1}{2} f_b$$

$$f_2 = f_c + \tfrac{1}{2} f_b$$

where $f_c$ (=1800 Hz) is the carrier frequency and $f_b$ (=2400 Hz) is the modulation frequency.

Figure 4B:
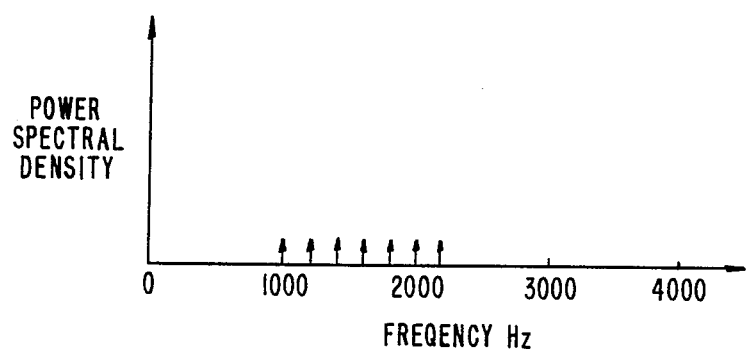
Figure 4C:
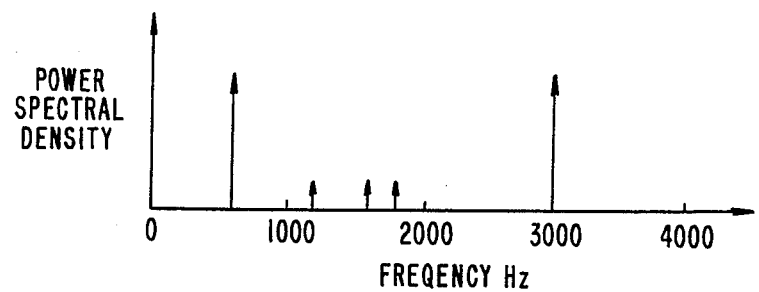

As mentioned above, during subsequent transmissions from the remote modems (see Table 2), the training signal alterations are transmitted in synchronism with selected address frequencies, selected from seven possible frequencies 1000 Hz, 1200 Hz, 1400 Hz, ..., 2200 Hz as shown in FIG. 4B. As an example, FIG. 4C shows the power spectral density for a training signal together with three address frequency transmissions at 1200 Hz, 1600 Hz and 1800 Hz.

During the receipt of the training signal alternations, DFT (Discrete Fourier Transform) calculations are effected in the individual DFT circuits in the DFT calculator 142 (FIG. 3) as follows:

$$V_{600} = \frac{1}{N} \sum_{n=0}^{N-1} s_i \cdot \exp(-j2\pi(n/9600) \cdot 600)$$

$$V_{3000} = \frac{1}{N} \sum_{n=0}^{N-1} s_i \cdot \exp(-j2\pi(n/9600) \cdot 3000)$$

for timing recovery initialization; and $$V_{1000} = \frac{1}{N} \sum_{n=0}^{N-1} s_i \cdot \exp(-j2\pi(n/9600) \cdot 1000)$$

$$V_{1200} = \frac{1}{N} \sum_{n=0}^{N-1} s_i \cdot \exp(-j2\pi(n/9600) \cdot 1200)$$

$$V_{2200} = \frac{1}{N} \sum_{n=0}^{N-1} s_i \cdot \exp(-j2\pi(n/9600) \cdot 2200)$$

for address frequency recognition. In the above equations $s_i$ denotes a receiver sample and $N = 48$. It will be appreciated that the DFT calculator 142 includes nine individual DFT calculator circuits, responsive respectively to the 600 Hz and 3000 Hz signals and the seven address frequencies 1000 Hz, 1200 Hz, ..., 2200 Hz.

It should be understood that the master modem receiver 80 detects that an authentic training signal is being received before the above-mentioned DFT calculations are commenced. The level of the received training signal is typically within the range −10 to −30 dBm and may be accompanied by background noise, in-band noise, low frequency hum and, where a relatively low frequency secondary channel is utilized in the modem communication system 10, by the in-band noise. It should be understood that a secondary channel operates independently of the main channel such that receipt of a main channel signal from a given remote modem may be subject to interference from a secondary channel signal of another remote modem. The levels of noise and secondary channel signal can be high, especially at large attenuation differences between the individual remote-master channels.

Referring again to FIGS. 3A and 3B, the operation of the master modem receiver 80 will be briefly described.

Initially the interpolation filter 202 passes its input without any delay and the switches S1-S6 inclusive are all in position 1. After a analog-to-digital conversion in the analog-to-digital converter 84, the sampled signal is applied to the notch filters 88 and 96, which are of identical construction and are adapted to suppress secondary channel frequencies. The output of the notch filter 96 is applied to the IIR filters 112 and 116, which operate as narrow band-pass filters at frequencies of 600 Hz and 3000 Hz respectively. The squared modulus determinator circuits 124 and 128 (FIG. 3B) serve to determine the strengths of the output signal from the filters 112, 116, and such strengths are compared with respective threshold levels in the training signal detector 134. These threshold levels are determined by the threshold setter circuit 152 in response to the peak signal level established by the peak level estimator circuit 146. When both threshold levels are exceeded, a training detection signal is issued, and the calculations in the DFT calculator are initiated. It will be appreciated that the instants that the squared modulus signals exceed their thresholds are independent of the level of the received signal. After completion of the DFT calculations the DFT results are applied under the control of the initialization control circuit 138 for timing recovery initialization and modem address recognition. At the conclusion of the training signal, the time shift is introduced into the interpolation filter 202, the switches S1-S6 inclusive are moved from position 1 to position 2, whereby the filters 112, 116 are switched into the timing recovery circuit (PLL) 198, and the gain control circuit 220 becomes operative. Also, the carrier on/off control circuit 164 is activated and becomes effective to detect a carrier signal fall-off by comparison of the outputs of the level estimator 160 and the peak level estimator 146.

Figure 5:
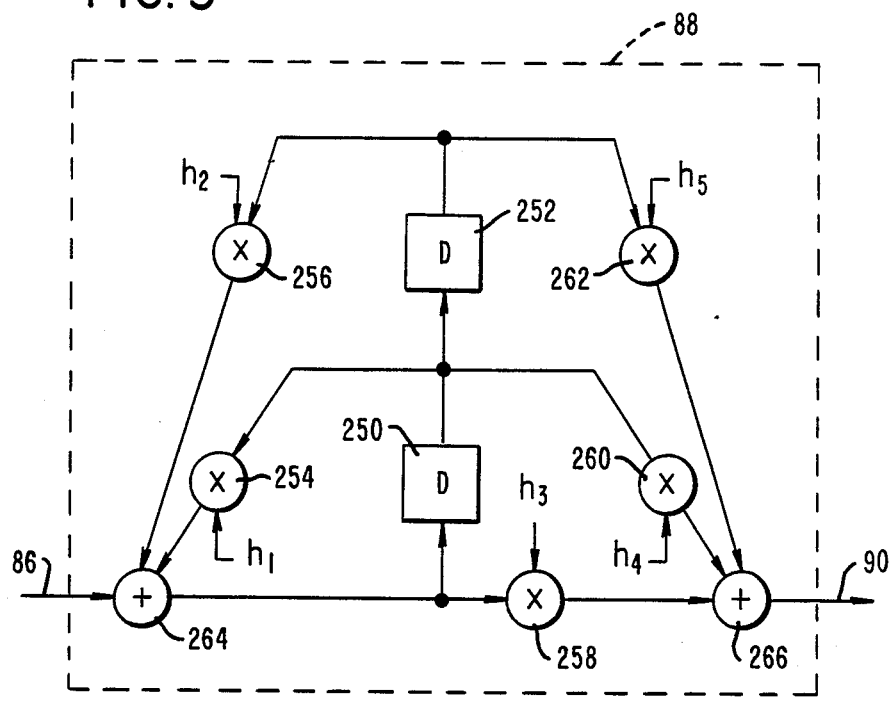
FIG. 5 is a diagram of a notch filter included in the master modem receiver.

Referring now to FIG. 5, there is shown a diagram of the notch filter 88 (FIG. 3A). The notch filter includes delays 250, 252, multipliers 254, 256, 258, 260, 262 and adders 264, 266 connected as shown in FIG. 5. The input line 86 of the notch filter 88 is connected to the adder 264 and the output of the adder 266 is connected to the output line 90 of the notch filter 88. The multipliers 254, 256, 258, 260 and 262 have the following multiplication coefficients applied thereto:

$h_1 = -1.813$ $h_2 = -0.870$ $h_3 = 0.921$ $h_4 = -1.800$ $h_5 = -0.921$

As mentioned above, the notch filter 88 is designed to suppress the relatively low frequency secondary channel signal. The notch filter 96 is of identical construction to the notch filter 88 and effects a further suppression of such secondary channel frequencies.

Figure 6:
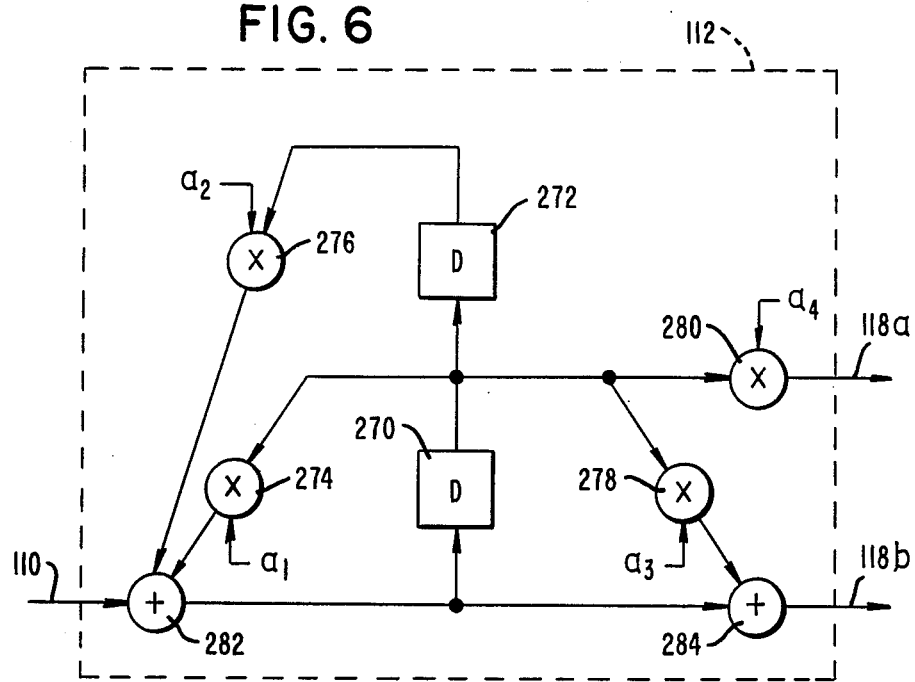
FIGS. 6 and 7 are diagrams of IIR filters included in the master modem.

Referring to FIG. 6, there is shown a diagram of the 600 Hz IIR filter 112 (FIG. 3A). The filter 112 includes delays 270, 272, multipliers 274, 276, 278, 280 and adders 282, 284 connected as shown in FIG. 6. The input line 110 of the filter 112 is connected to the adder 282 and the outputs 118a, 118b of the multiplier 280 and the adder 284 form the (complex) output 118 of the filter 112. The multipliers 274, 276, 278, 280 have the following coefficients applied thereto:

$a_1 = -1.856$ $a_2 = 0.960$ $a_3 = -0.928$ $a_4 = -0.315$

The filter 88 is designed to pass a narrow band around 600 Hz.

Figure 7:
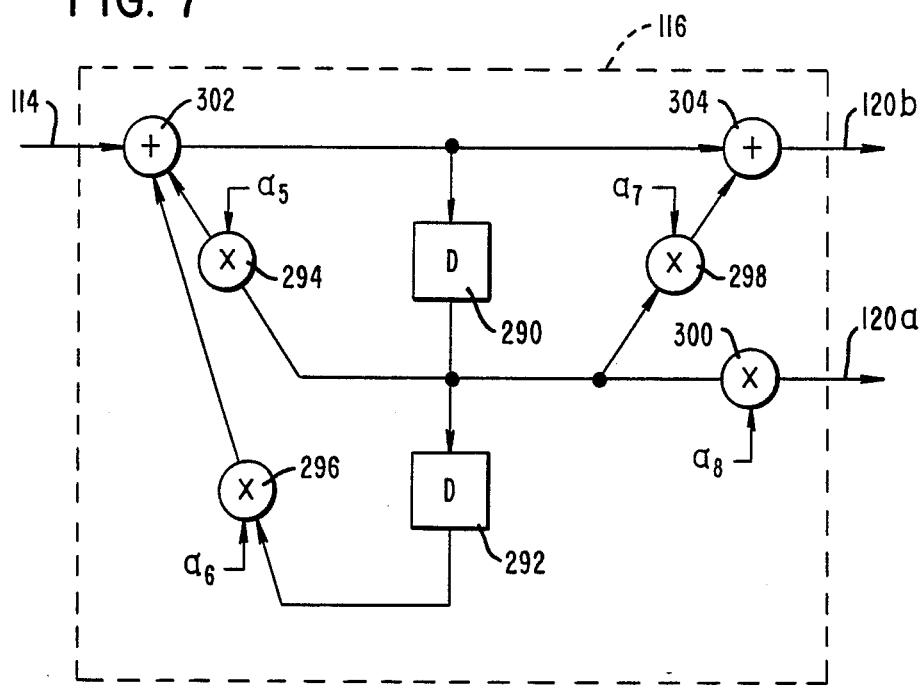

Referring now to FIG. 7, there is shown a diagram of the 3000 Hz IIR filter 116 (FIG. 3A). The filter 116 includes delays 290, 292, multipliers 294, 296, 298, 300, and adders 302, 304, connected as shown in FIG. 7. The input line 114 of the filter 116 is applied to the adder 302 and the outputs 120a, 120b of the multiplier 300 and the adder 304 form the (complex) output 120 of the filter 116. The multipliers 294, 296, 298 and 300 have the following coefficients applied thereto:

$a_5 = 0.630$ $a_6 = 0.960$ $a_7 = 0.315$ $a_8 = 0.928$

The filter 116 is designed to pass a narrow band around 3000 Hz.

Figure 8:
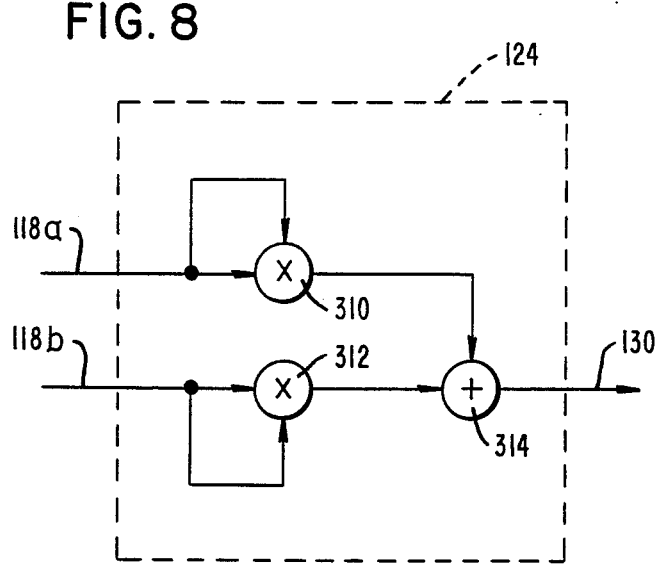
FIG. 8 is a diagram of a squared modulus determinator circuit included in the master modem receiver.

Referring now to FIG. 8, there is shown a diagram of the squared modulus determinator 124 (FIG. 3B). The (complex) signal on the input lines 118a and 118b, which together form the line 118 shown in FIG. 3, is applied to a pair of multipliers 310 and 312 as shown in FIG. 8. The outputs of the multiplers 310, 312 are connected to an adder 314, the output of which forms the output 130 of the squared modulus determinator 124.

Figure 9:
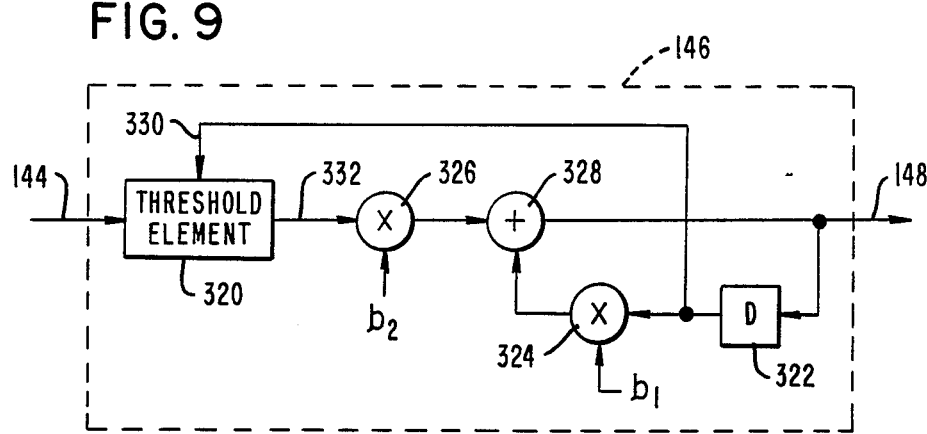
FIG. 9 is a diagram of the peak level estimator circuit included in the master modem receiver.

Referring now to FIG. 9, there is shown a diagram of the peak level estimator 146 (FIG. 3B). The peak level estimator 146 includes a threshold element 320, a delay 322, multipliers 324 and 326 and an adder 328. The threshold element 320 receives as its inputs the input signal on the line 144 and the output of the delay element 322 on a line 330. The threshold element 320 transforms the signal on the line 144 to a positive valued signal, and if this positive valued signal is greater than the signal on the line 330, that positive valued signal appears on the output line 332 of the threshold element 332 of the threshold element 320. Otherwise, the output of the threshold element 320 is zero. The output signal of the peak level estimator 146 on the line 148 is formed by the output of the adder 328. The multipliers 324 and 326 have the following coefficients applied thereto:

$b_1 = 0.999$ $b_2 = 1.000$

Thus, the peak level estimator 146 provides an output signal on the line 148 which is dependent on the peak level of the input signal on the line 144.

Figure 10:
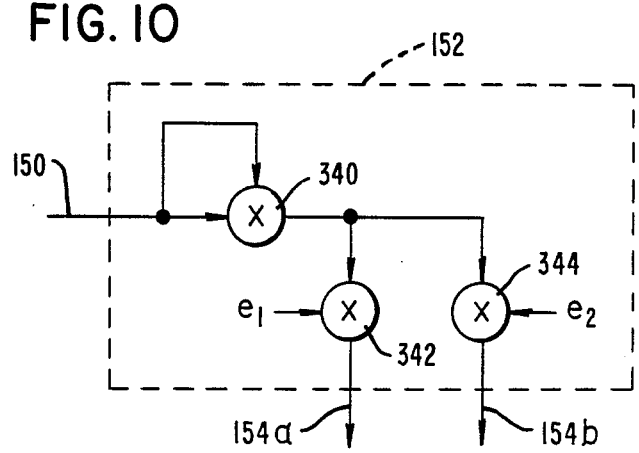
FIG. 10 is a diagram of the threshold setter circuit included in the master modem receiver.

Referring to FIG. 10, there is shown a diagram of the threshold setter circuit 152 (FIG. 3B). The input of the threshold setter circuit 152 on the line 150 is applied to two inputs of a multiplier 340, the output of which is applied to two multipliers 342 and 344, which have coefficients $e_1$ and $e_2$ applied thereto with the following values:

$e_1 = 0.4420$ $e_2 = 0.0616$

The outputs of the multipliers 342, 344 on lines 154a, 154b form the output of the threshold setter circuit 152, shown as line 154 in FIG. 3B. It will be appreciated that the multiplier 340 squares the input signal to the threshold setter 152, whereby a signal level-independent comparison with the outputs of the squared modulus determinator circuits 124 and 128 may be effected in the training signal detector 134.

Figure 11:
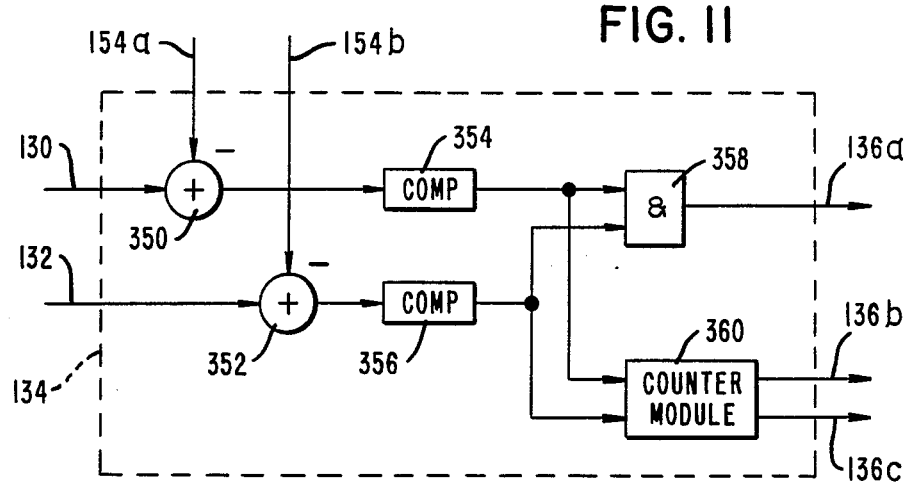
FIG. 11 is a diagram of the training signal detector circuit included in the master modem receiver.

Referring to FIG. 11, there is shown a diagram of the training signal detector circuit 134 (FIG. 3B), which has input lines 130 and 132 connected to the squared modulus determinator 124 and 128, respectively. The input line 130 is applied to an adder 350 which has a subtractive input connected over the input line 154a from the threshold setter 152. The input line 132 is connected to an adder 352 which has a subtractive input connected over the input line 154b from the threshold setter 152. The outputs of the adders 350, 352 are connected to respective comparators 354, 356 which compare the outputs of the adders 350, 352 to a zero reference level. Thus, the outputs of the comparators 354, 356 determine whether the 600 Hz and 3000 Hz thresholds are exceeded. The outputs of the comparators 354, 356 are connected to an AND gate 358 and to a counter module 360. The AND gate 358 provides an output on a line 136a when both the 600 Hz threshold level and the 3000 Hz threshold level are exceeded. The counter module 360 has a pair of outputs 136b and 136c on which are provided count value signals $n_1$ and $n_2$, respectively. The count value signal $n_1$ is utilized by the initialization control circuit 138 (FIG. 3B) to select the first buffered sample from the buffer register 206 to initiate DFT calculator circuits for 600 Hz and 3000 Hz in the DFT calculator 142. The count value $n_1$ is in the range of 12 to 20 and depends on the instant that the thresholds for the 600 Hz and 3000 Hz squared modulus signals are exceeded. The count value $n_1$ corresponds to the minimum number out of two numbers of sample intervals. These two numbers correspond to two periods, the first of which extends from 20 sample intervals before the 600 Hz squared modulus signal exceeds its threshold until the instant of training signal detection, and the second of which extends from 12 sample intervals before the 3000 Hz squared modulus signal exceeds its threshold until the instant of training signal detection.

The count value $n_2$ is utilized by the initialization control circuit 138 to select the first buffered sample from the buffer register 206 to initiate the DFT calculator circuits for the address frequencies 1000 Hz, 1200 Hz, . . . , 2200 Hz in the DFT calculator 142. This counter value $n_2$ has a value of 12 or greater.

It will be appreciated that both amplitude and delay distortion will delay the instant at which the training signal detector 134 detects a training signal. For example, if the 3000 Hz component has 5 dB more attenuation, then it would take 1 millisecond longer before the corresponding threshold is exceeded. As another example, if the 600 Hz component has 2 milliseconds more delay, then it would take 2 milliseconds longer before its threshold is exceeded. An analysis for extreme distortion conditions can be made to derive suitable values $e_1$ and $e_2$ for the threshold setter circuit 152 in order to ensure reliable training signal detection. However, at the instant of training signal detection by the detector 134, a training signal has already been received for a short period. Since the receiver samples are stored in the buffer register 206, such stored samples are available for use in DFT calculations, as mentioned above. In the preferred embodiment, independent of telephone line distortion, a proper 600 Hz training signal component has been received for five symbol intervals before the 600 Hz squared modulus signal exceeds its threshold and a proper 3000 Hz training signal component has been received for three symbol intervals before the 3000 Hz squared modulus signal exceeds its threshold. Thus, the appropriate start for DFT calculations for 600 Hz and 3000 Hz is the earliest buffered sample received during both the five symbol intervals before the 600 Hz squared modulus threshold is exceeded and the three symbol intervals before the 3000 Hz squared threshold modulus is exceeded. It is to be noted that at a symbol rate of 2400 Baud and a sample frequency of 9600 Hz, one symbol interval corresponds to four sample intervals.

Also independent of telephone distortion, proper address frequency components at 1000 Hz, 1200 Hz, . . . , 2200 Hz will have been received for three symbol intervals preceding the instant that one of the 600 Hz and 3000 Hz thresholds has been exceeded. Thus, a different buffered sample is selected to commence DFT calculations for the address frequencies than is selected for the 600 Hz and 3000 Hz components. However, both DFT start points are determined such that the earliest sample selected is such that a reliable signal was present. The length of the training sequence is sufficient to allow for uncertainties with regard to distortion, whereby reliable and accurate DFT calculation results will be obtained.

Figure 12:
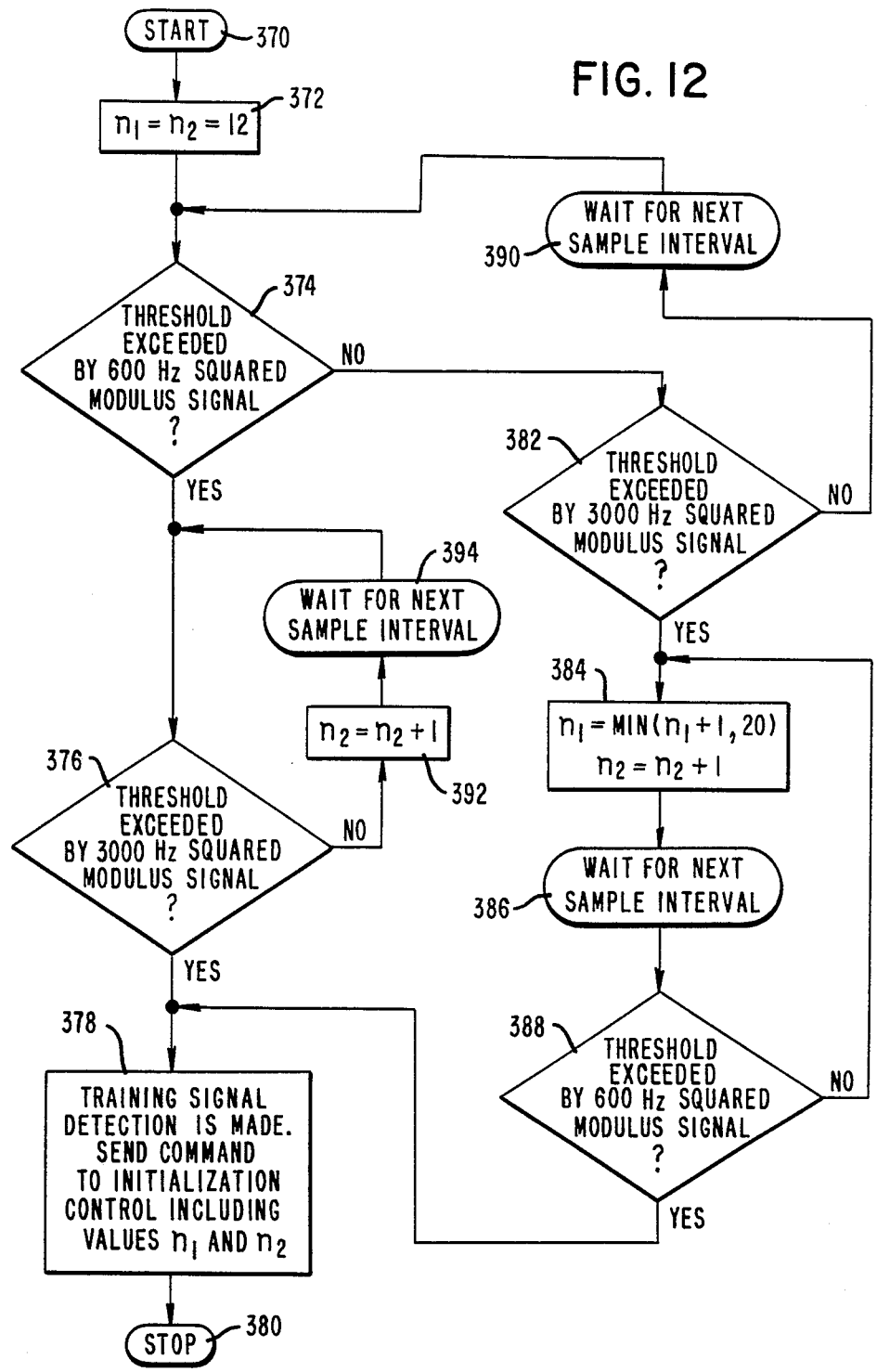
FIG. 12 is a flowchart illustrating the operation of a counter module included in the training signal detector circuit.

Turning now to FIG. 12, there is shown a flowchart for the operation of the counter module 360 in developing the count values $n_1$ and $n_2$ discussed hereinabove. The operation starts at block 370. At block 370, both $n_1$ and $n_2$ are set equal to 12. At block 374, a check is made as to whether the 600 Hz squared modulus threshold has been exceeded. If so, the flow proceeds to box 376, where a check is made as to whether the 3000 Hz squared modulus has been exceeded. If so, the flow proceeds to box 378 indicating that a training signal has been detected and a training signal is sent to the initialization control circuit 138, together with the values of $n_1$ and $n_2$. The operation then stops at box 380.

If the 600 Hz threshold has not been exceeded, the flow proceeds to box 382 where a check is made as to whether the 3000 Hz squared modulus threshold has been exceeded. If so, the flow proceeds to box 384, where $n_1$ is set equal to the minimum of $n_1 + 1$ and 20, and where $n_2$ is replaced by $n_2 + 1$. The flow then proceeds to wait until the next sample interval occurs, as shown at box 386. A check is then made as shown at box 388 as to whether the 600 Hz squared modulus threshold has been exceeded. If so, the flow proceeds to box 378, already discussed above and if not, the flow returns to box 384. If the 3000 Hz squared modulus threshold has not been exceeded at block 382, the flow waits for the next sample interval at box 390 and then returns to the block 374. If the 3000 Hz squared modulus signal has not been exceeded at box 376, $n_2$ is replaced by $n_2 + 1$ according to box 392, the next sample interval is waited for, as shown at box 394, and the flow returns to box 376. Thus, the desired values of $n_1$ and $n_2$ are calculated, whereby the appropriate samples may be selected from the buffer register 206 (FIG. 3B), for example by means of a rotary switch in the DFT calculator 142, having terminals connected to the individual stages or the buffer register 206.

Figure 13:
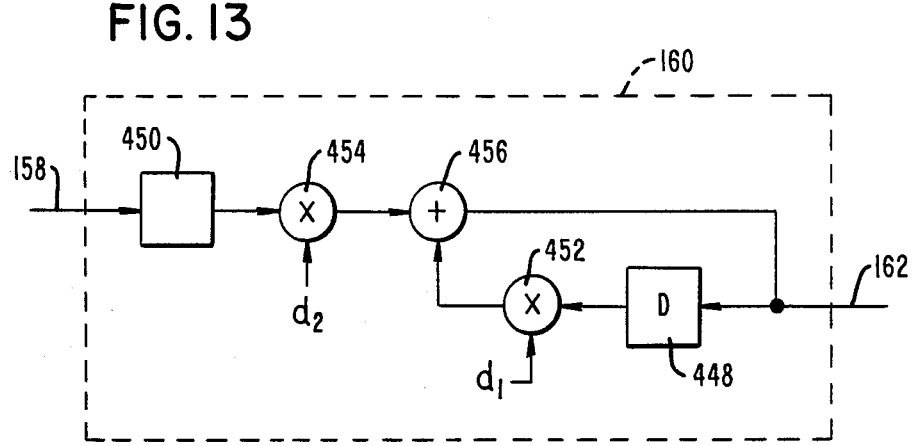
FIG. 13 is a diagram of the level estimator circuit included in the training signal detector circuit.

Referring to FIG. 13, there is shown a diagram of the level estimator circuit 160 (FIG. 3B). The level estimator circuit 160 includes a delay 448, a signal rectifier 450, multipliers 452, 454, and an adder 456. The signal rectifier 450 converts any negative input signal to a corresponding positive signal, in a known manner. The output of the signal rectifier 450 is then multiplied by a coefficient $d_2$ in the multiplier 454, the output of which is applied to the adder 456. The output of the adder 456 is coupled directly to the output line 162 of the level estimator circuit 160. The multipliers 452 and 454 have the following coefficients applied thereto:

$d_1 = 0.98$ $d_2 = 0.02$

The feedback loop including the delay 448 and the multiplier 452 operates in the manner of a leaky integrator, and provides an averaging of the signal over a time period.

Figure 14:
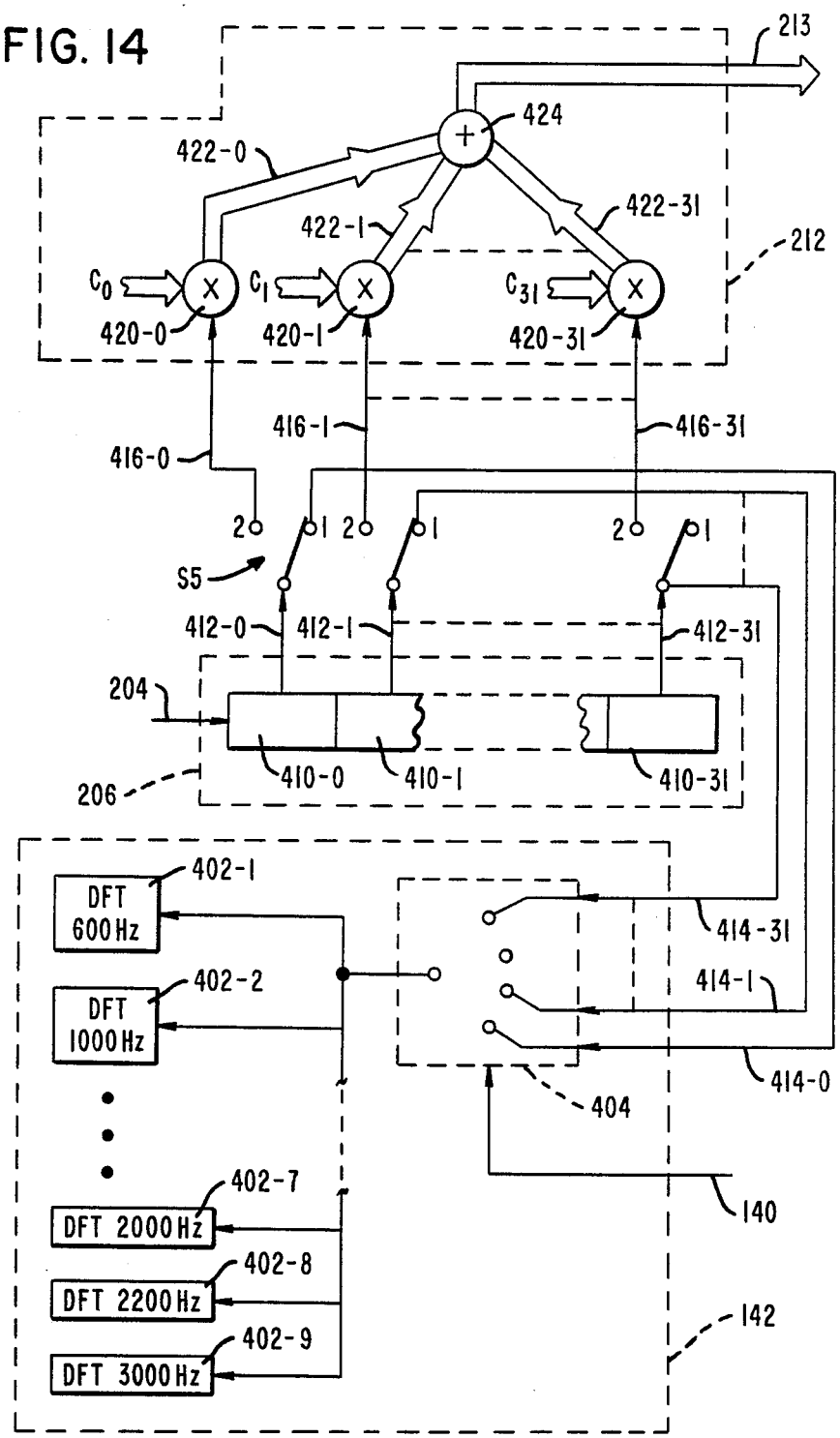
FIG. 14 is a diagram of the DFT calculator, the buffer shift register and the band-pass filter included in the modem receiver.

Referring to FIG. 14, there is shown a more detailed diagram of the DFT calculator 142 (FIG. 3B), the buffer shift register 206 and the band-pass filter 212. The DFT calculator 142 contains nine DFT calculators 402-1 to 402-9 inclusive responsive to frequencies of 600 Hz, 1000 Hz, 1200 Hz, 1400 Hz, 1600 Hz, 1800 Hz, 2000 Hz, 2200 Hz and 3000 Hz, respectively. A switch 404 is responsive to the count value signals $n_1$ and $n_2$, discussed hereinabove, to select the appropriate signal sample to commence DFT calculations in the DFT calculators 402-1 to 402-9 inclusive. The DFT calculators 402-1 to 402-9 have outputs (not shown) connected to address recognition means (not shown) for use in timing adjustment control. Since these applications do not form part of the present invention, they will not be discussed further herein. The DFT calculator circuits 402-1 to 402-9 each measure the correlation between a respective locally generated frequency and the applied signal. DFT calculator circuits are described in detail in the previously cited U.S. Pat. No. 4,577,334.

The buffer shift register 206 includes thirty-two shift register stages 410-0 to 410-31 inclusive, the stage 410-0 receiving the input signal over the line 204. The outputs of the stages 410-0 to 410-31 inclusive are connected over lines 412-0, 412-1, ..., 412-31 to thirty-two individual switches referred to collectively as switch S5. These switches have terminals 1 connected over lines 414-0, 414-1, ..., 414-31 to the switch 404 in the DFT calculator 142, and terminals 2 connected over lines 416-0, 416-1, ..., 416-31 to the band-pass filter 212.

The band-pass filter 212 includes thirty-two multipliers 420-0 to 420-31 inclusive having inputs coupled to the lines 416-0 to 416-31 inclusive and also adapted to receive multiplier coefficients $C_0$ to $C_{31}$ inclusive. The coefficients $C_0$ to $C_{31}$ inclusive are complex values which are selected to give the desired band-pass characteristics for the filter 212. The complex-valued outputs of the multipliers 420-0 to 420-31 inclusive are connected over lines 422-0 to 422-31 inclusive to an adder 424 which provides the output of the band-pass filter 212 on line 213. Referring back briefly to FIG. 3B, the input of the demodulator 216 is provided via the line 214 with a lower frequency than the sample clock frequency, which has a nominal value of 9600 Hz. Thus, where the equalizer 224 is of a so-called fractionally T/2 spaced type, every other output sample of the band-pass filter 212 on the line 213 is transferred via the switch S6 and the line 214 to the demodulator 216.

Figure 15:
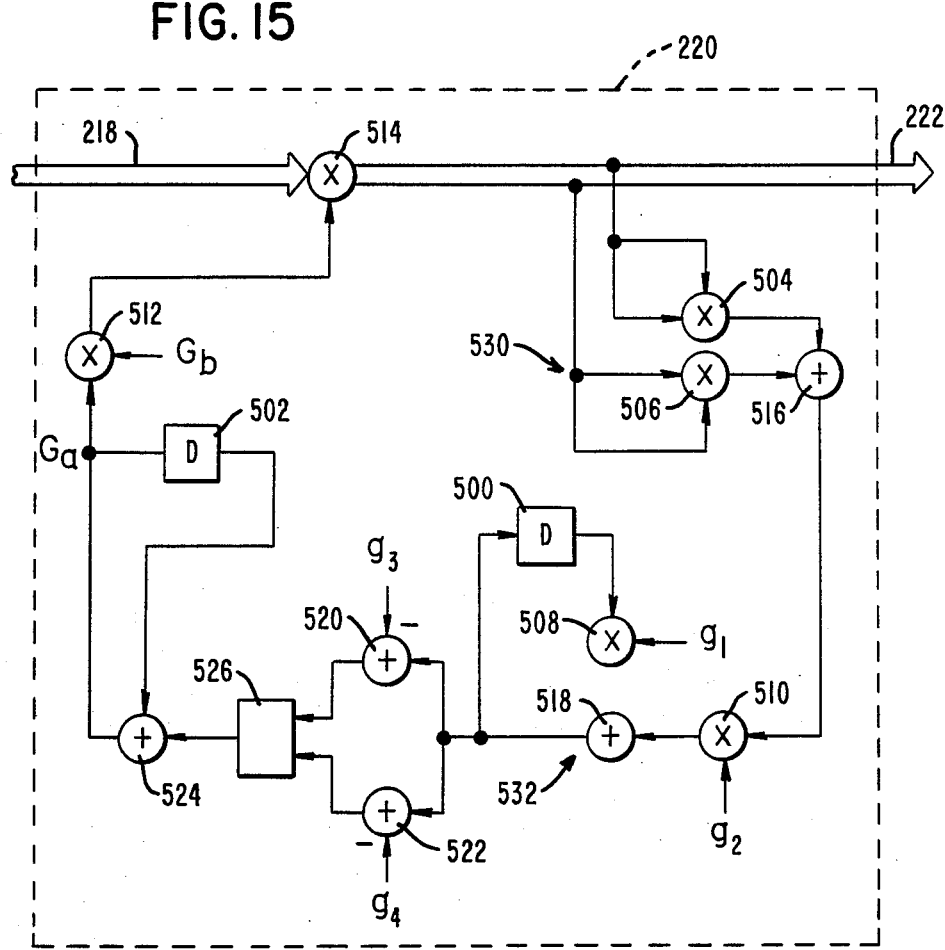
FIG. 15 is a diagram of the gain control circuit included in the master modem receiver.

Referring to FIG. 15, there is shown a diagram of the gain control circuit 220 (FIG. 3B). The gain control circuit 220 includes delays 500 and 502, multipliers 504, 506, 508, 510, 512 and 514, adders 516, 518, 520, 522 and 524 and an incrementing circuit 526. The complex-value input signal on the line 218 is multiplied in the multiplier 514 with the product of the separate, real-value gain factors $G_a$ and $G_b$, from the multiplier 512. The output of the multiplier 514, which forms the outputs of the gain control circuit 220, is applied to a squared modulus determinator 530 formed by the multipliers 504 and 506 and the adder 516. The output of the adder 516 is applied to a leaky integrator circuit 532 formed by the delay 500, the multipliers 508 and 510 and the adder 518. The multipliers 508, 510 have coefficients $g_1$ and $g_2$ applied thereto with the values:

$g_1 = 0.999975$ $g_2 = 0.000025$

The leaky integrator 532 has an averaging period of 40,000 two-sample-intervals (about eight seconds). The output of the leaky integrator 532 is compared with two threshold values $g_3$ and $g_4$ by the adders 520 and 522, which function as subtractors as indicated by the minus signs shown in FIG. 15. The upper threshold value $g_3 = 0.063$ lies 1% above a reference value for the internal (mean square) level and the lower threshold value $g_4 = 0.062$ lies 1% below such reference value. If the output of the leaky integrator 532 is above the upper threshold value $g_3$, the gain factor $G_a$ is decreased by a small unit step in the incrementing circuit 526. If the output of the leaky integrator circuit is below the low threshold value $g_4$, the gain factor $G_a$ is increased by the small unit step in the incrementing circuit 526. In the preferred embodiment the value of the unit step is $0.25 \times 10^{-6}$. The gain factor $G_b$ is fixed during the transmission of the initial training signal (Table 1). Thus, during segment $SG_1$ of the initial training signal, the output of the 600 Hz calculator circuit 402.1 (FIG. 14) included in the DFT calculator 142 is utilized to initialize the gain factors by an approximation of the optimum values, using a table look-up. This provides an initial value of $G_a$ which is in the range of 0.1 to 0.2 and a value of $G_b = 2^k$ (where $k = 1, 2, 3, ...$ or 10). The initial value of the delay 500 in the leaky integrator 532 is the target reference value for the internal (mean square) level 0.0625. Amplitude distortion at 600 Hz is in the range 0 to 3 dB. Since a compromise connection is applied for amplitude distortion at the initialization of the gain factors $G_a$ and $G_b$, the influence of amplitude distortion with regard to the approximation of the optimal gain factor values is small. Then, during the initial training segment $SG_4$ (Table 1), the values of $G_a$ and $G_b$ are stored in the receiver parameter storage unit 240 (FIG. 3B).

During a subsequent transmission from one of the remote modems 14, 16 or 18, the values of $G_a$ and $G_b$ stored during the initial training are reloaded into the gain control circuit 220 and the delay element 500 is initialized with the target value 0.0625. After the subsequent training signal it will be appreciated that $G_a$ can be adapted slowly in increments of Δ, while $G_b$ remains fixed. It will also be appreciated that, after the training signal, when the switch S6 (FIG. 3B) has moved to its position 2, the gain control circuit 220 makes only a very slow adjustment to the received signal. Also, the gain control circuit 220, which makes adjustments to ensure a normalized RMS (Root Mean Square) output level, has minimum disturbance (a) from the secondary channel signal, since such signal is eliminated by the notch filter 88 and the band-pass filter 212; and (b) from noise, accidental signal peaks and level fluctuation, because of its slowness. In this connection, it is advantageous to have normalization of the input of the equalizer 224 (FIG. 3B) since this enables receive level independent adaption for the equalizer 224 and automatic phase control circuit 228, rapid fluctuations in the telephone line attenuation being compensated in the automatic phase control circuit 228.

Thus, there has been described a modem receiver which provides a reliable detection of the received training signal and the utilization of a very short training sequence. The circuit described performs well at receive levels in a large range without any preselection and in the presence of noise and secondary channel interference. Furthermore, an efficient utilization of hardware is achieved by using filters which are located in the timing recovery phase locked loop for training signal detection. In addition, since there is no gain control in the training signal detection circuitry, an interval which allows degradation by early gain adjustment is not required. The gain control circuit, which is located after the band-pass filter, normalizes the internal power level at such location and gives slow adjustment with minimum disturbance in the presence of noise, secondary channel interference and accidental signal peaks.

What is claimed is:

1. A data modem receiver for receiving analog signals transmitted on a transmission line from a remote location, said analog signals including a training signal having a spectrum with strong components at first and second predetermined frequencies, comprising:
   analog-to-digital conversion means adapted to convert said analog signals to corresponding digital signals;
   first and second digital filters operatively coupled to said analog-to-digital conversion means and responsive respectively to said first and second predetermined frequencies;
   first and second strength estimation means operatively coupled to said first and second digital filters and adapted to measure the respective strengths of the output signals thereof;
   threshold setting means adapted to provide first and second threshold level signals; and
   training signal detector means operatively coupled to said threshold setting means and to said first and second strength estimation means, and adapted to compare the outputs of said first and second strength estimation means with said first and second threshold level signals respectively and to provide a training indicator signal in response to both said first and second threshold level signals being exceeded.

2. A data modem receiver according to claim 1, including notch filter means adapted to suppress a predetermined frequency band, disposed between said analog-to-digital conversion means and said first and second digital filters.

3. A data modem receiver according to claim 2, wherein said first and second digital filters are IIR filters adjusted to produce first and second complex valued output signals and wherein said strength estimation means includes first and second squared modulus determination circuits adapted to determine the squared modulus values of said first and second complex valued output signals.

4. A data modem receiver according to claim 3, wherein said threshold setting means includes peak level estimator means adapted to provide an output signal dependent on the peak level of the received signal, and a threshold setter circuit including first and second multipliers responsive to said output signal and to respective multiplier coefficients associated with said first and second predetermined frequencies, and adapted to provide said first and second threshold level signals.

5. A data modem receiver according to claim 4, also including buffer storage means coupled to said notch filter means and adapted to store signal samples provided by said analog-to-digital conversion means, said data modem receiver further including Discrete Fourier Transform (DFT) calculation means coupled to said buffer storage means and adapted to perform DFT calculations using said stored signal samples in response to the provision of said training indicator signal.

6. A data modem receiver according to claim 5, wherein said training signal is transmitted in synchronism with modem address frequencies, and wherein said DFT calculation means includes a first plurality of DFT calculators adapted to perform first DFT calculations in accordance with said first and second predetermined frequencies and a second plurality of DFT calculators adapted to perform second DFT calculation in accordance with said address frequencies, and wherein said training signal detector means includes counter means adapted to provide first and second count value signals identifying first and second ones of the signal samples stored in said buffer storage means for initiating said first and second DFT calculations respectively.

7. A data modem receiver according to claim 1, including timing recovery means coupled to said first and second digital filters and to said analog-to-digital conversion means.

8. A data modem receiver according to claim 7, including switching means coupled to outputs of said first and second digital filters, and adapted to selectively connect said first and second digital filters to said first and second strength estimation means or to said timing recovery means.

9. A data modem receiver according to claim 5, including interpolation filter means coupled between said notch filter means and said buffer storage means.

10. A data modem receiver according to claim 5, also including band-pass filter means to which said buffer storage means is coupled, said data modem receiver further including gain control means adapted to provide gain control for the output of said band-pass filter means.

11. A data modem receiver according to claim 10, including demodulator means coupled between said band-pass filter means and said gain control means.

12. A data modem receiver according to claim 10, wherein said gain control circuit is operable in accordance with a first, fixed gain control factor, and a second, incrementable gain control factor.

* * * * *